US012344297B2

(12) United States Patent
Hilleary

(10) Patent No.: US 12,344,297 B2
(45) **Date of Patent: *Jul. 1, 2025**

(54) WARNING LIGHT SENSOR SYSTEM FOR AUTOMATICALLY DETERMINING A PROPER OPERATION OF A RAILROAD CROSSING WARNING SYSTEM

(71) Applicant: THE ISLAND RADAR COMPANY, Olathe, KS (US)

(72) Inventor: Thomas N. Hilleary, Lenexa, KS (US)

(73) Assignee: The Island Radar Company, Olathe, KS (US)

(*) Notice: Subject to any disclaimer, the term of this patent is extended or adjusted under 35 U.S.C. 154(b) by 505 days.

This patent is subject to a terminal disclaimer.

(21) Appl. No.: 17/157,156

(22) Filed: Jan. 25, 2021

(65) Prior Publication Data

US 2021/0139061 A1 May 13, 2021

Related U.S. Application Data

(63) Continuation of application No. 14/993,191, filed on Jan. 12, 2016, now Pat. No. 10,899,374.

(60) Provisional application No. 62/102,297, filed on Jan. 12, 2015.

(51) Int. Cl.

| | |
|---|---|
| ***B61L 29/30*** | (2006.01) |
| ***B61L 23/04*** | (2006.01) |
| ***B61L 27/53*** | (2022.01) |
| ***G08G 1/04*** | (2006.01) |
| ***G08G 1/07*** | (2006.01) |
| ***G08G 1/087*** | (2006.01) |
| ***G08G 1/097*** | (2006.01) |
| *B61L 29/28* | (2006.01) |

(52) U.S. Cl.

CPC ............. *B61L 29/30* (2013.01); *B61L 23/041* (2013.01); *B61L 27/53* (2022.01); *G08G 1/04* (2013.01); *G08G 1/07* (2013.01); *G08G 1/087* (2013.01); *G08G 1/097* (2013.01); *B61L 29/28* (2013.01)

(58) Field of Classification Search

CPC ......... B61L 29/30; B61L 23/041; G08G 1/04; G08G 1/07; G08G 1/087; G08G 1/097

See application file for complete search history.

(56) References Cited

U.S. PATENT DOCUMENTS

| | | | | |
|---|---|---|---|---|
| 5,825,412 | A * | 10/1998 | Hobson | H04N 7/18 348/148 |
| 6,163,755 | A | 12/2000 | Peer et al. | |
| 6,179,252 | B1 * | 1/2001 | Roop | B61L 29/18 246/122 R |
| 6,688,561 | B2 | 2/2004 | Mollet et al. | |
| 7,123,165 | B2 | 10/2006 | Davenport et al. | |
| 7,356,966 | B2 | 4/2008 | Burke | |
| 7,789,348 | B2 | 9/2010 | Ruggiero et al. | |
| 7,869,621 | B1 * | 1/2011 | Arpa | B61L 27/57 382/104 |
| 8,548,655 | B2 | 10/2013 | Kanner | |

(Continued)

*Primary Examiner* — Zachary L Kuhfuss

(74) *Attorney, Agent, or Firm* — Armstrong Teasdale LLP

(57) ABSTRACT

A warning light sensor system for a railroad crossing including a warning light includes a process-based device configured to analyze received real time images of the warning light, determine, whether the crossing warning system is operating properly; and communicate a confirmation that the crossing warning system is operating properly prior to the train arriving at the railroad crossing.

22 Claims, 6 Drawing Sheets

(56) References Cited

U.S. PATENT DOCUMENTS

| | | | | |
|---|---|---|---|---|
| 8,596,587 | B2 | 12/2013 | Hilleary | |
| 8,676,411 | B2 | 3/2014 | Kanner | |
| 8,909,396 | B2 | 12/2014 | Hilleary | |
| 9,321,460 | B2 * | 4/2016 | Sasabuchi | B60W 30/09 |
| 9,376,129 | B2 | 6/2016 | Hilleary | |
| 9,947,219 | B2 | 4/2018 | Rolle et al. | |
| 10,665,118 | B2 | 5/2020 | Hilleary | |
| 10,773,742 | B2 | 9/2020 | Toshack | |
| 10,899,374 | B2 * | 1/2021 | Hilleary | G08G 1/04 |
| 2007/0040070 | A1 | 2/2007 | Stevenson et al. | |
| 2008/0169939 | A1 | 7/2008 | Dickens et al. | |
| 2010/0258682 | A1 | 10/2010 | Fries et al. | |
| 2011/0084176 | A1 | 4/2011 | Reichelt et al. | |
| 2013/0193275 | A1 | 8/2013 | Baines et al. | |
| 2013/0194423 | A1 | 8/2013 | Baines et al. | |
| 2013/0256466 | A1 * | 10/2013 | Carlson | B61L 27/53 246/218 |
| 2014/0003724 | A1 * | 1/2014 | Feris | G06T 7/194 382/197 |
| 2014/0334677 | A1 | 11/2014 | Kuo et al. | |
| 2014/0339374 | A1 * | 11/2014 | Mian | B61L 29/30 246/473.1 |
| 2016/0189552 | A1 | 6/2016 | Hilleary | |
| 2016/0200334 | A1 | 7/2016 | Hilleary | |
| 2019/0185036 | A1 | 6/2019 | Mian et al. | |

* cited by examiner

WARNING LIGHT SENSOR SYSTEM FOR AUTOMATICALLY DETERMINING A PROPER OPERATION OF A RAILROAD CROSSING WARNING SYSTEM

CROSS REFERENCE TO RELATED APPLICATIONS

This application is a continuation application of U.S. application Ser. No. 14/993,191 filed Jan. 12, 2016 which claims the benefit of U.S. Provisional Application Ser. No. 62/102,297 filed Jan. 12, 2015, the complete disclosures of which are hereby incorporated by reference in their entirety.

BACKGROUND OF THE INVENTION

The field of the invention relates generally to railroad crossing detection and activation systems, and more specifically to a railroad crossing gate position detection system and methods facilitating automotive vehicle traffic control proximate railroad grade crossings.

Detection and activation systems are generally known that are activated as a locomotive approaches a rail grade crossing or intersection of a railroad track or tracks and a road surface for automotive vehicle use. Among other things, such railroad crossing detection and activation systems may operate flashing and non-flashing warning lights and one or more crossing gates to keep automotive vehicles from entering the crossing as the locomotive approaches, as well as allow vehicles to exit the crossing before the train arrives. Such crossing detection and activation systems are generally effective for the railroad's purposes but nonetheless limited in some aspects.

Improving vehicle traffic flow at railroad crossings is desirable for a number of reasons. Conventional railroad crossing warning systems are designed predominately from a safety perspective at each crossing where they are installed. Such systems are beneficial for the railroad, and provide some protection to vehicle drivers as well, but at the same time present substantial disruption to vehicle traffic. Information from railroad crossing detection and activation systems would be beneficial to improving vehicular traffic flow in and around railroad crossings. There are a number of practical problems, however, in interfacing vehicle traffic intersection control systems with railroad crossing warning systems and accordingly such interfaces have yet to be realized in most cases.

BRIEF DESCRIPTION OF THE DRAWINGS

Non-limiting and non-exhaustive embodiments are described with reference to the following Figures, wherein like reference numerals refer to like parts throughout the various views unless otherwise specified.

DETAILED DESCRIPTION OF THE INVENTION

The following discussion of exemplary and advantageous embodiments is presented for purposes of illustration and description of the inventive concepts disclosed, and is not intended to be exhaustive or limited to the particular embodiments in the form disclosed. Many modifications and variations of the concepts disclosed will be apparent to those of ordinary skill in the art. Further, different advantageous embodiments may provide different advantages as compared to other advantageous embodiments. The embodiment or embodiments selected are chosen and described in order to best explain the principles of the embodiments, the practical application of the concepts disclosed, and to enable others of ordinary skill in the art to understand the disclosure for various embodiments with various modifications as are suited to the particular uses contemplated. Method aspects implementing advantageous features will be in part apparent and in part explicitly discussed in the description below.

Low cost interface systems and methods for railroad crossing detection and activation system are described below that detect and communicate an operation of railroad crossing gate. Activation of warning lights, changes in position of railroad crossing gates, as well as verification of crossing gate position may be reliably detected without requiring a direct connection to railroad equipment. That is, the crossing gate position detection and verification systems operate independently and autonomously from railroad equipment associated with the crossing.

Accordingly, exemplary embodiments of systems and methods described herein are configured to determine and communicate or notify a position of railroad crossing gates to non-railroad systems including but not necessarily limited to automotive traffic control systems adjacent the railroad crossing. The notifications or communications are generated based on the sensing of crossing gate activation and crossing gate positions at a crossing island by a video analytic system located at a distance from the crossing gates. The video analytic system may, in turn, communicate the position of the crossing gate to a third party system such as traffic control system that is not operated by the railroad, but that can beneficially be coordinated with the railroad crossing detection and activation system without necessarily connecting to the crossing detection and activation system at all. The video analytic system can therefore interface with automotive traffic control systems without introducing additional expense, maintenance or liability concerns to the railroad organization.

Figure 1:
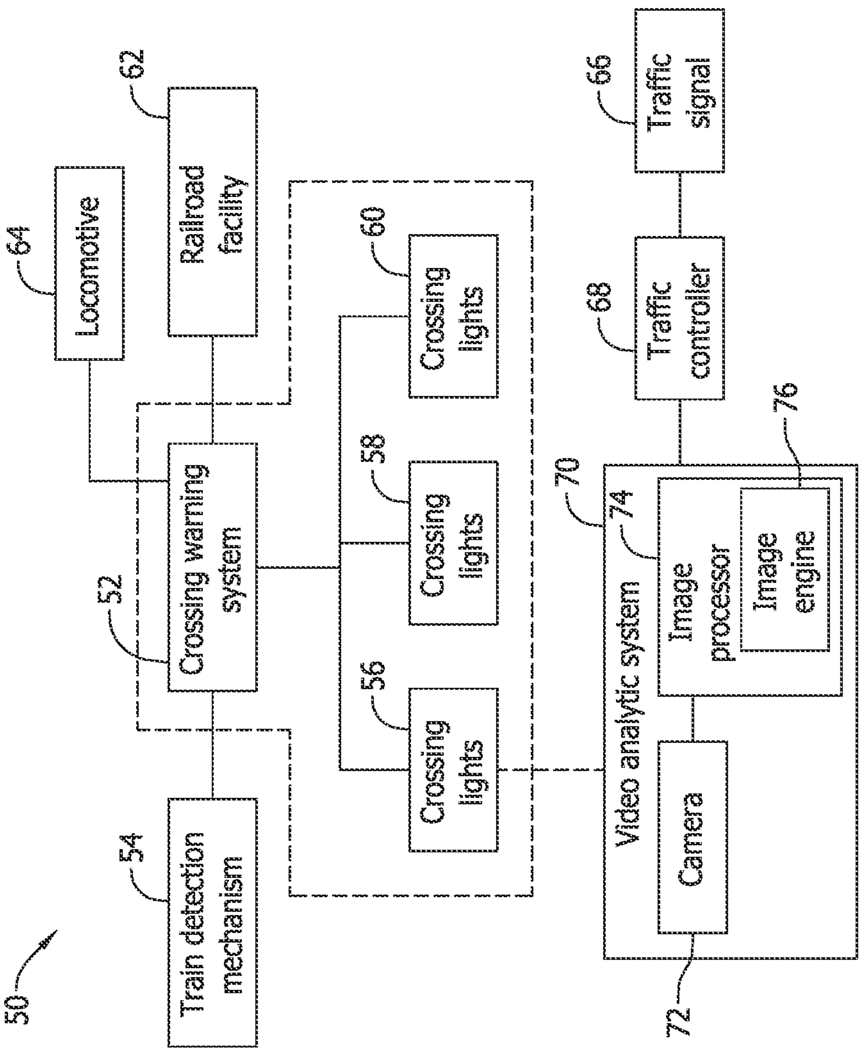
FIG. 1 is an exemplary block diagram of a railroad crossing detection and activation system including a crossing gate sensor system according to an embodiment of the present invention.

FIG. 1 is an exemplary block diagram of an exemplary railroad crossing detection and activation system 50 including a crossing gate sensor system according to an embodiment of the present invention.

As shown in FIG. 1, the railroad crossing detection and activation system 50 includes a crossing warning system 52 that receives an input signal from a train detection mechanism 54 as a locomotive train approaches a railroad crossing. The crossing warning system 52 includes a controller that assumes control of a railroad crossing in the manner explained below to secure the crossing for a locomotive advancing toward the crossing.

As used herein, the term "controller" shall include, for example, a microcomputer, a programmable logic controller, or other processor-based device. Accordingly, a controller may include a microprocessor and a memory for storing instructions, control algorithms and other information as required to function in the manner explained below. The controller memory may be, for example, a random access memory (RAM), or other forms of memory used in conjunction with RAM memory, including but not limited to flash memory (FLASH), programmable read only memory (PROM), and electronically erasable programmable read only memory (EEPROM). Alternatively, non-processor based electronics and circuitry may be provided in the controller with equal effect to serve similar objectives. For example, a supercapacitor may be provided to give the controller time to store procedure sensitive data such as the current state in a software based state machine in the event of power loss. Other elements such as line filters and capacitors for filtering noisy power may be included.

The crossing warning system 52, and specifically the controller thereof, in response to a train detection signal from the train detection mechanism 54, may in turn operate one or more crossing gates 56, crossing lights 58 and crossing alarms 60 at the location of the crossing so that automotive vehicle drivers, pedestrians, bystanders, railroad personnel, etc. at the site of the crossing are advised that a train's arrival at the crossing is imminent.

The crossing gates 56 are lowered to present an obstruction to an automotive vehicle on the roadway proximate the crossing and provide a visual cue to a vehicle driver to stop the vehicle. The crossing lights 58, which may be provided on the crossing gate 56, are intended to flash red or amber light signals to persons in the vicinity, providing further visual cues to drivers and persons that caution is needed. The alarms 60 may provide audio indication such as bells or other sounds to call further attention to the crossing and warn persons in the vicinity to exercise caution. In combination, the gates 56, lights 58 and alarms 60 are intended to provide various types of warnings that a train arrival is imminent. The gates 56, lights 58 and alarms 60 are typically operated with some lead time before the train arrives to allow vehicles or persons to clear the crossing before the train arrives.

In practice, the Federal Railway Administration (FRA) generally requires that the train detection mechanism 54 and the crossing warning system 52 are operable such that a locomotive train is detected and the crossing warning system 52 is activated at least twenty seconds before the train arrives at the crossing. Additionally, the FRA requires that a minimum of 85% of the crossing lights 58, and particularly the static (i.e., non-flashing) and dynamic (i.e., flashing) lights provided on the crossing gate masts and the crossing gate arms as described further below are operational and viewable by the motoring public at any given point in time. Indeed, these two functions are termed "vital" by the FRA and the performance and periodic maintenance of the components and equipment associated with assuring their proper design and operation is accordingly regulated by the FRA. Any failure of these two functions is called an Activation Failure and carries penalties. Accordingly, the railroad organization(s) operating the locomotives bear exclusive responsibility to install and maintain the crossing warning system 52.

All other functions associated with the crossing, while important, are not classified as "vital" by the FRA. However, these other functions also typically the responsibility of the railroad organization(s) to maintain due to their physical placement on railroad equipment or property and their typical connection to other parts of the railroad's crossing warning system 52. These "other" functions and crossing warning system components include audible bells associated with the crossing alarms 60, operation of crossing gates 56, and optional vehicle detection equipment or systems (for four quadrant gate, dynamic exit gate operation).

The crossing warning system 52, via the controller thereof, may also communicate with a railroad facility 62 and a locomotive 64 on approach. The railroad facility 62 and locomotive 64 may accordingly receive confirmation that the warning system 52 is operating prior to the train arriving at the crossing. The railroad facility 62 and/or the locomotive 64 may log the operation of the crossing system 52 and crossing events for the benefit of a railroad operator.

The crossing warning system 52 and associated gates 56, lights 58 and alarms 60, as well as the train detection mechanism 54 may each be conventional, and as such are well known and firmly established in the art. As mentioned above, the elements 52, 54, 56, 58, and 60 are typically owned, installed, operated and maintained by the railroad operator.

As also shown in FIG. 1, one or more traffic signals 66 is present proximate to a railroad crossing and are operated by a traffic intersection controller 68. The traffic intersection controller 68, like the controller of the crossing warning system 52, may be a processor based device, such as a microcomputer, a programmable logic controller, or other processor-based device, or may include non-processor based electronics and circuitry to serve similar objectives. Control algorithms and the like may be stored and executed by the traffic intersection controller 68 to coordinate automotive traffic in the vicinity of the railroad crossing. The traffic signal(s) 66 and traffic intersection controller 68 are sometimes referred to as a traffic control system. Further, the traffic signal(s) 66 and traffic intersection controller 68 may be part of a larger traffic control network including multiple controllers and a plurality of signal lights at different roadway intersections. The traffic intersection control system may coordinate and oversee vehicle traffic on a network of roadways that include more than one railroad crossing.

The traffic signals 66 and controller 68 are, in contrast to the crossing warning system 52, not typically owned, installed, operated and maintained by the railroad operator. Instead, the traffic signals 66 and controller 68 are owned and operated by other third party authorities responsible for vehicular traffic control. While the traffic intersection controller 68 and the crossing warning system 52 can be directly interfaced so that the traffic intersection controller 68 can also respond to an activation of the crossing warning system 52, gate position, and train occupancy and operate the traffic signal(s) 66 preemptively to clear the crossing, such preemptive traffic control is itself a disruptive event to vehicular traffic flow impacted by the activated and occupied crossing. Because the traffic signals 66 and controller 68 are separately owned, operated and provided from the crossing warning system 52, the crossing warning system 52 and the vehicle traffic control system including the traffic signal 66 and controller 68 tend to operate with a high degree of autonomy. As a result, automotive vehicle drivers in non-crossing roadway lanes at an adjacent pre-empted intersection sometimes see unnecessary red traffic signals ahead while the railroad crossing gates 56 are down. Depending on the length of the train and speed of the train, and also the amount of automotive traffic in the area at the time of the crossing of the train, disruptive and avoidable traffic flow problems may result that persist for some time during train occupancy as well as after the train has departed.

Interfacing the crossing warning system 52 and one or more traffic intersection controllers 68 in the vicinity of a railroad crossing would provide possible improvements in traffic flow and control while a train crossing is underway that could mitigate some of the present traffic flow issues and alleviate the effects of train crossings. For example, if the traffic intersection controller 68 received a signal that the crossing warning system 52 has been activated, it could operate traffic signals 66 adjacent the crossing, and perhaps even in adjacent roadway intersections to allow traffic to move for vehicles that do not need to enter the crossing. That is, the traffic intersection controller 68 could operate traffic signals 66 in different patterns when the crossing is occupied by a train or otherwise blocked as described below than when the crossing is not occupied by a train or is not blocked. Priority could be given to certain vehicle paths and the traffic signals 66 could be intelligently operated by the controller 68 if the controller 68 was provided an indication that the crossing is occupied or blocked. For a number of reasons discussed below, however, railroad organizations are typically reluctant to facilitate such interfaces that require a modification of the crossing warning system 52 and/or a direct combination of the warning system 52 and a traffic intersection controller 68.

Known railroad crossing detection and activation systems such as the crossing warning system 52 are physically integrated at the location of a crossing, and the necessary sensors and controls are hard wired at the point of installation and operated and maintained by railroad organizations. While information generated by a crossing detection and activation system, and specifically information regarding a position of the crossing gates and train occupancy information, may be useful for various third party purposes including but not limited improving automotive traffic control and efficiency at adjacent signalized traffic intersections beyond the railroad's own use, railroad organizations are understandably reluctant to provide it. In particular, railroad organizations are reluctant to authorize relatively expensive modifications and add-on components to existing crossing detection and activation systems such as the crossing warning system 52. Railroad organizations are also reluctant to incur increased maintenance issues or potential liability issues relating to providing such information for third party use. As such, information and valuable added functionality to non-railroad organizations regarding the state of a railroad crossing and certain operating parameters of the crossing detection and activation system such as the crossing warning system 52 at any given point in time is presently underutilized.

Cost effective systems and methods are desired that address the concerns of railroad organizations while nonetheless making some information available, or alternatively making more information available, that concerns the state of a railroad crossing and certain operating parameters of the crossing detection and activation system 50 and/or a crossing warning system 52. Accordingly, and as shown in FIG. 1, a video analytic sensor system 70 is provided including at least one camera 72 and at least one image processing device 74 that provides a relatively cost effective communication interface to the traffic intersection controller 68 that a railroad crossing is active, that the gates are down, and/or the crossing is now occupied by a train. More specifically, the video analytic system 70 is advantageously installed at a location at a distance from, but in a line of sight with, one or more of the crossing gates 56. Using techniques such as those described below, the video analytic system 70 may provide a gate position signal that can be wirelessly communicated or otherwise input to the traffic intersection controller 68.

In contemplated embodiments, a wired DC circuit is established between the traffic intersection controller 68 and the video analytic system 70. The traffic intersection controller 68 is supplied a voltage signal by the video analytic system 70 when the barrier of the gate is raised, or alternatively when it is lowered. Failsafe measures can be implemented such that if the voltage signal is not supplied (e.g., because of a broken wire) the safer signal state results from the traffic intersection controller 68. If desired, redundant signal paths (e.g., wired and wireless signal paths could be provided for additional failsafe assurance. It shall be understood, however, that so long as the video analytic system 70 can provide crossing gate position and train occupancy information for the benefit of the traffic intersection controller 68, the particular mode of communication between them is not particularly important.

No direct, hard-wired connection or modification to the crossing warning system 52 is required for the video analytic system 70 and there is virtually no impact to the railroad organization when present. In other words, the video analytic system 70 is completely autonomous from the crossing warning system 52. The video analytic system 70 provides an indirect indication that the crossing warning system 52 has been activated as well as monitoring a position of the crossing gates 56 and train occupancy in real time.

The video analytic system 70 may be mounted at a location adjacent to the railroad crossing, but not necessarily on railroad property. The railroad crossing warning system lights 58 are positioned and aimed in a manner that provides maximum conspicuity to vehicles on roadways approaching the crossing. Further, the frequency and intensity of the warning lights 58 and lenses therefore have been designed to maximize visibility across dynamically varying ambient lighting and meteorological conditions. Accordingly, the optimum positioning of the camera 72 is at a point that is representative of a vehicle approaching the crossing. The camera 72 may be a known video camera suitable for outdoor operation. In contemplated embodiments, the camera 72 may include an enclosures having an IP66 rating from the International Electrotechnical Commission's (IEC) international standard 60529 rating board such that the enclosure offers full protection from dust and solid matter larger than dust as well as moisture protection to ensure reliable operation under the elements.

The image processing device 74 in contemplated embodiments may be a processor based device configured with an analytic image processing engine 76 sufficient to perform the functionality described below in real time. The analytic processing engine 76 may be implemented in algorithmic form to accomplish the objectives described below in identifying and verifying operation of the crossing gates 56 in various aspects. The image processing device 74 may be located at the crossing or at another location. Communication between the camera 72 and the image processing device 74 and also between the image processing device 74 and the traffic intersection controller 68 may be established in any manner desired.

Figure 2:
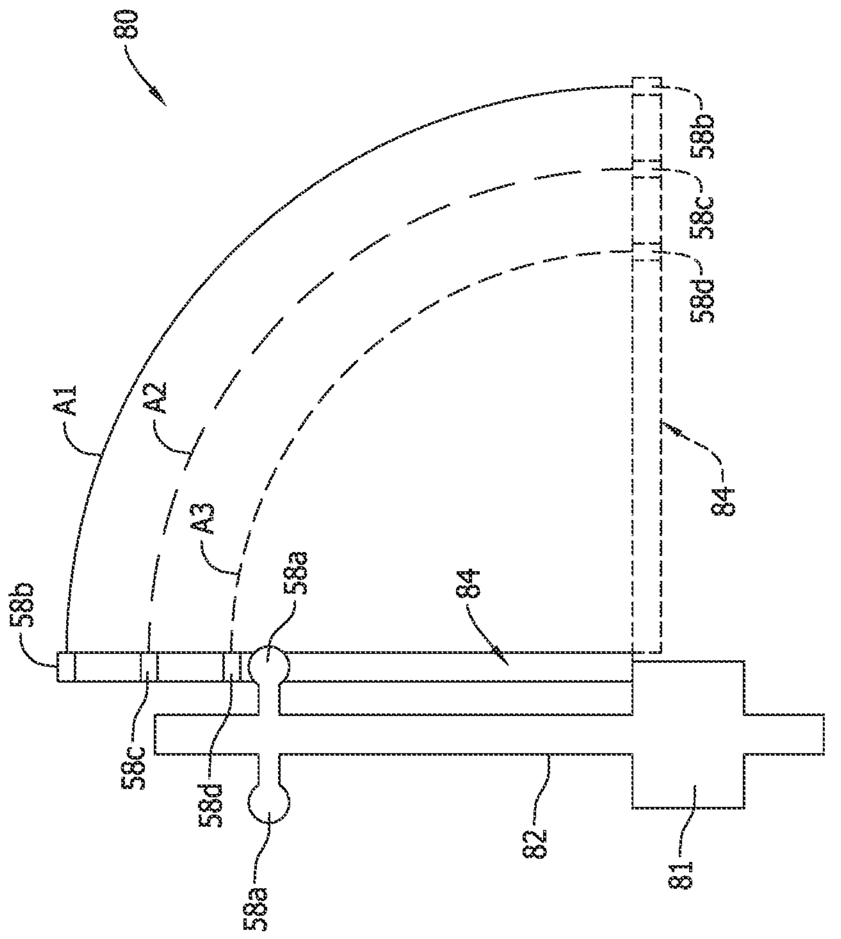
FIG. 2 illustrates aspects of the sensor system shown in FIG. 1 in combination with a railroad crossing gate in different operating positions.

Turning now to FIG. 2, an exemplary crossing gate 80 is shown that may be utilized as a crossing gate 56 in the railroad crossing detection and activation system 50 (FIG. 1). The crossing gate 80 in the example shown includes a base 81 that may be anchored in place at an appropriate location proximate the railroad crossing, a stationary support 82 extending upwardly from the base 81 that in the example shown includes crossing lights 58*a* extending transversely from the stationary support 82 at a predetermined height above the base 81. An audio alarm 60 (not shown in FIG. 2) may also be provided on the support 82. The crossing gate 80 shown is exemplary only in certain aspects. Other configurations may be provided without limitation. That is, the crossing gate 80 shown in FIG. 2 is but one example of a crossing gate that may be utilized as the gates 56 represented in FIG. 1.

The crossing gate 80 in the example shown further includes a movable arm or barrier 84. The movable arm or barrier 84 is operable between a generally raised and vertical position shown in solid lines in FIG. 2 that is maintained in the absence of a locomotive approaching the crossing. Motors, actuators, switches and control elements are provided in a conventional manner to operate the crossing gate 80 and move the barrier or arm 84 when commanded by the crossing warning system 52. When the movable barrier or arm 84 is in the raised position, vehicles may freely pass over the crossing free of any obstruction. When a train has been detected on approach, the movable barrier or arm 84 is lowered to a generally horizontal position shown in phantom lines in FIG. 2 that extends across the roadway in the path of a vehicle and blocking a vehicle from entering the crossing as the locomotive approaches. In a crossing warning system 52 having multiple gates 80, or multiple sets of gates 80, the operation of the crossing gates 80, and specifically the positioning of the movable barriers or arms 84 can be somewhat sophisticated to allow vehicles to exit the crossing while preventing further vehicles from entering the crossing. That is, the movable barriers or arms 84 cam be lowered and raised in a sequenced operation such that different barriers or arms 84 are raised or lowered at different times.

As seen in the example of FIG. 2, the movable barrier or arm 84 of the crossing gate 80 includes multiple warning lights 58*b*, 58*c* and 58*d* that each moves with the barrier or arm 84 between the raised and lowered positions. The light 58*b* is shown at the distal end or tip of the movable barrier or arm 84 and in contemplated embodiments is a static (i.e., non-flashing) warning light. The warning light 58*c* is located in spaced relation from the distal end or tip of the movable barrier or arm 84 and at a predetermined distance from the light 58*b* and in contemplated embodiments is a dynamic (i.e., flashing) warning light. The warning light 58*d* is located in spaced relation from the distal end of the movable barrier or arm 84 and also the light 58*c* and in contemplated embodiments the light 58*d* is a dynamic (i.e., flashing) warning light. As such, each respective warning light 58*b*, 58*c* and 58*d* is respectively closer to the tip of the movable barrier 84. Alternatively stated, each respective warning light 58*b*, 58*c* and 58*d* is respectively farther from the crossing gate base 81. The warning lights 58*b*, 58*c* and 58*d* provided on the movable barrier 84, and also the lights 58*a* mounted to the stationary support 82 may be the same or different color in various embodiments, and in contemplated embodiments are red incandescent or LED lights as customarily utilized in railroad crossing gates. The lights described are exemplary only. Greater or fewer numbers of lights may be provided in other embodiments with similar effect.

Because of the different positions of the warning lights 58*a* on the stationary support 82*a* and the set of lights 58*b*, 58*c* and 58*d* provided on the movable barrier 82, unique image signatures can be detected by the video analytic system 70 in various different embodiments as the crossing gate 80 is operated by the crossing warning system 52 (FIG. 1). For example, the on/off condition of the warning lights (or intensity and wavelength of the lights) can be detected by the camera 72 and the image processor device 74 (FIG. 1) of the video analytic system 70 to sense and indicate illumination of each light 58*a*, 58*b*, 58*c*, 58*d* and hence an activation of the crossing warning system 52.

Changes in relative position of the lights 58*a*, 58*b*, 58*c* and 58*d* can be detected to indicate a change in position of the movable barrier 84. The lights 58*a* are stationary and hence do not move regardless of the position of the movable barrier 84 relative to the stationary support 82, while when the movable barrier is raised and lowered the warning lights 58*b*, 58*c* and 58*d* follow a unique path of travel that can be observed and verified with the video analytic system 70 as further described below.

As shown in FIG. 2, the warning light 58*b* located closest to the tip of the barrier 82 follows a first, outer arcuate path of travel (shown in FIG. 2 as path A1) as the movable barrier 84 is moved between fully raised and fully lowered positions. The warning light 58*c* follows a second, intermediate arcuate path of travel (shown in FIG. 2 as path A2) as the movable barrier 84 is moved between fully raised and fully lowered positions. The warning light 58*d* follows a third, inner arcuate path of travel (shown in FIG. 2 as path A3) as the movable barrier 84 is moved between fully raised and fully lowered positions. The radius of the arcuate paths of travel A1, A2 and A3 is different via the respective positions of the warning lights 58*b*, 58*c* and 58*d* on the movable barrier 884. The radius of the arcuate paths of travel A1, A2 and A3 may be varied in different embodiments, but it should be evident from FIG. 2 that the image processing engine 76 in the video analytic system 70 can be configured to look for moving warning lights along at least one of the paths A1, A2 and A3 to detect a raising or lowering of the barrier 84. Since the raised position of the movable barrier 84 is generally vertically oriented and the lowered position of the movable barrier 84 is generally horizontally oriented, each path of travel A1, A2 and A3 extends for about 90 angular degrees, and the video analytic system may be calibrated to detect the travel of the warning lights 58*b*, 58*c* and 58*d* along each respective path.

In contemplated embodiments, the video image processing engine 76 in the video analytic system 70 is operable to sense and detect moving warning lights along each of the paths A1, A2 and A3. The video analytic system 70 is likewise configured to distinguish other moving lights that may be present and in the sight of the camera 72 of the video analytic system 70 to avoid potential false gate position detections. For example, and as mentioned above, the warning light 58*b* on the barrier 82 is a static light while the warning lights 58*c* and 58*d* are flashing lights. The image processing engine 76 in the video analytic system 70 can in this scenario look for the combination of the static warning light 58*b* traveling the path A1 and flashing warning lights 58*c* and 58*d* following the respective paths A2 and A3 to determine that the crossing gate barrier 84 is moving. Optionally, the image processing engine 76 in the video analytic system 70 can also look for the illuminated, but completely stationary warning lights 58*a* in combination with the moving warning lights 58*b*, 58*c* and 58*d* to confirm that the crossing gate barrier 84 is moving with additional assurance.

In a further embodiment, the image processing engine 76 in the video analytic system 70 can further be configured to look for a specific frequency and/or alternating pattern corresponding to the flashing warning lights 58*a* and/or the lights 58*c* and 58*d* moving along the paths A2 and A3 to more reliably confirm a change in gate position and avoid a potential false position change detection by the video analytic system 70. The direction of movement of the warning lights 58*b*, 58*c*, 58*d* can be detected to determine whether the barrier 84 is being raised or lowered.

Alternatively, an initial position of the warning lights 58*b*, 58*c*, 58*d* in the image obtained by the camera 72 can be processed by the image processing engine 74 to determine whether the crossing gate barrier 84 begins in the raised position (e.g., the warning lights 58*b*, 58*c* and 58*d* are arranged vertically in the image) and ends in the lowered position (e.g., the warning lights 58*b*, 58*c* and 58*d* are arranged horizontally in the image) or vice versa and thus confirm whether the barrier 84 has moved completely between the fully raised and lowered positions. Similarly, the image processing engine 76 in the video analytic system 70 can confirm the status of the barrier 84 as being raised or lowered apart from activation of the warning lights 58*b*, 58*c*, 58*d* by taking note of their relative vertical or horizontal positioning relative to one another.

As one illustrative example, in a contemplated embodiment the flashing warning lights 58*a* on the stationary arm 82 begin to flash alternately at a rate of 35-65 flashes per minute. The color of the flashing warning lights 58*a* may also be specified as a fixed red wavelength of 650 nm or 6500 Å, and the color of the warning lights 58*c*, 58*d* on the movable barrier 84 may be specified to match the flashing warning lights 58*a* and also may flash alternately on the barrier 84. In contrast, the end tip light 58*b* on the barrier 84 is constantly on (i.e., does not flash). The image processing engine 76 in the video analytic system 70 can be configured to look for any or all of the flashing warning lights 58*a*, 58*c*, 58*d* that meet the specified color and frequency of flashing as applicable, and in the case of the warning lights 58*c* and 58*d* the movement of the flashing warning lights in the specified frequency along the paths A2 or A3. When the color, frequency and movement of the flashing warning lights are seen in combination with the image processing engine 76 with the end tip warning light 58*b* moving along the path A1 without flashing, the movement of the barrier 84 can be determined with a high degree of reliability and instances of false movement detection from other illumination sources in the camera field of view can be practically eliminated. The more warning lights that the image processing engine 76 in the video analytic system 70 is configured to process, the better and more reliable the video analytic system 70 becomes, but it should be recognized that in certain installations the video analytic system 70 may nonetheless operate satisfactorily by monitoring and sensing a state of less than all the warning lights described, including a single warning light in some embodiments, provided on the crossing gate 80.

Regardless of the specific detection features that may be utilized (e.g., mere illumination, color, flashing frequency of a warning light or lights operating as predicted when the crossing warning system has been activated, and/or movement of a warning light or lights operating along an expected or predicted path of motion such as A1, A2 and A3 when the crossing warning system has been activated) to sense a state of one or more of the lights 58*a*, 58*b*, 58*c* and 58*d* a signal can be provided to the traffic intersection controller 68 as an indication that the crossing warning system 52 has been activated. That is, when a predictable or predetermined illumination, position and/or movement of one or more of the lights 58*b*, 58*c*, 58*d* has been detected by the video analytic system 70 a signal can be provided to the traffic intersection controller 68 as an indication that the movable crossing gate barrier 84 has been raised or lowered.

The video analytic system 70 can use the same detection techniques described above to detect and signal error conditions or malfunctions of the crossing gates 80. For example, if the image processing engine 76 in the video analytic system 70 detects that the flashing warning lights 58*c*, 58*d* assume a stationary position that does not correspond to a fully raised or lowered position of the barrier 84, the video analytic system 70 can send an error signal that the barrier 84 has not fully completed its movement between the raised and lowered position. The error signal can be provided to the railroad and the traffic intersection controller 68 for appropriate maintenance response.

As another example, if the image processing engine 76 in the video analytic system 70 fails to detect any of the warning lights 58*b*, 58*c* and 58*d* in the image acquired, this can be an indication that the barrier 84 has been broken off and an error signal can be provided to the railroad and the traffic intersection controller 68 for appropriate response.

As still another example, if the image processing engine 76 in the video analytic system 70 detects some, but not all of the warning lights 58*a*, 58*b*, 58*c* and 58*d* exhibiting the expected color, frequency and movement this can be an indication that the barrier 84 is partly broken, that certain of the warning lights 58*a*, 58*b*, 58*c* or 58*d* have become inoperative, and/or that the crossing gate 80 needs maintenance. An error signal can accordingly be provided to the railroad and the traffic intersection controller 68 for appropriate maintenance response.

Using the techniques described above a single, strategically placed camera 72 of the video analytic system 70 can simultaneously sense and monitor multiple crossing gates at various locations in the crossing and can independently monitor and verify the operation and status of each gate. It is understood, however, that in some embodiments multiple cameras 72 having different lines of sight may be desirable to monitor different gates and may be utilized in a similar manner to that described above. In a multiple camera embodiment, the cameras provided may communicate with the same image processor device 74 or different image processor devices 74.

The video analytic system 70 may also be utilized to generate a train occupancy signal that is sometimes desired for the reasons discussed further below. The image processing engine 76 in the video analytic system 70 can be configured to recognize the unique image signature of a locomotive train as it passes relative to the crossing gates, or the train occupancy (i.e., presence of the train) may be inferred via a disruption of detected lights in an expected manner when the train arrives. For example, considering two crossing gates on opposing sides of railroad tracks, the video analytic system 70 may see and process images of both crossing gates when a locomotive is not present, but only one of them when the train is present because the train blocks the lines of sight and obscures the view of one of the crossing gates.

The video analytic system 70 may be flexibly installed at any desired location in sight of the crossing gates 80 provided, and eliminates the need for the traffic control system and the railroad crossing warning equipment to be connected with outside, point-to-point wiring.

Communication between the video analytic system 70 and the traffic intersection controller 68 may be established in any manner described above or otherwise known in the art, including wireless and non-wireless connections and direct or indirect communication paths between the devices. Intermediate devices such as transmitters, receivers and transceivers may also be utilized to facilitate crossing warning activation and gate position signals for vehicular traffic control purposes by the traffic intersection controller 68 to more efficiently control the traffic signals 66. Crossing warning system activation signals, gate position detection signals, and/or train occupancy signals derived from operation of the video analytic system 70 can be transmitted over practically any distance desired. Importantly, such signals can be provided by the video analytic system 70 to more than one traffic intersection controller 68. Traffic flow both upstream and downstream from the railroad crossing can be intelligently controlled with multiple traffic intersection controllers 68. Traffic signals can be prioritized to route traffic not impacted by the occupied or blocked crossing, for example, emergency dispatch vehicles.

A positive indication that entrance and exit crossing gates, if utilized, have been activated may also optionally be provided in some embodiments to the traffic intersection controller 68. When present, such positive indication or crossing gate position (i.e., whether the crossing gate arm or barrier is in a raised position or a fully lowered position) also may indicate to the traffic intersection controller 68 that vehicles are not in the crossing island and may allow for termination of a Track Clearance Green signal before a conventional pre-set time period expires. Positive indication of gate position realizes a more efficient pre-emption system for traffic control purposes.

The primary objective of a pre-emption system is to signal the adjacent traffic intersection that a train is approaching so that (1) the traffic intersection can present a red signal to vehicles that would otherwise be entering the crossing, (2) present a green signal to vehicles that may be on the crossing island so that they can clear the crossing, and (3) present a red signal to certain vehicles at the traffic intersection so that vehicles that need to clear the crossing island can do so (for example, vehicles traveling in a cross-ways manner to the lanes that extend through the crossing island).

In a conventional application, when the crossing warning system 52 is activated and is communicated to the traffic intersection controller 68 by the railroad equipment, the Track Clearance Green signal is provided to traffic lanes that cross the railroad tracks to give these traffic lanes priority until a pre-set time period expires so that vehicles can safely exit the crossing before the locomotive train arrives. Of course, the pre-set time period for the Track Clearance Green signal is conventionally set longer than needed to actually clear the crossing, and as a result traffic is stopped for what may be perceived as an inordinately long period of time to vehicle drivers, long enough that sometimes drivers proceed in defiance of the traffic signals. In many conventional systems, absent any indication of gate down status or train occupancy status, the Track Clearance Green signal and opposing traffic intersection red signals will persist for the entirety of the train movement through the crossing. Depending on the speed and length of the train, this can result in considerable traffic delay and disruption that the present invention may effectively avoid.

Alternatively, the train occupancy detection and associated signal afforded by the video analytic system 70 may trigger termination of a Track Clearance Green signal by the traffic intersection controller 68 that allows traffic flow to resume more quickly than conventional systems would otherwise allow. When the train itself occupies the crossing no vehicles can be present and the Track Clearance Green signal may be therefore be terminated by the adjacent traffic intersection controller 68.

When the video analytic system 70 determines that vehicles are prevented from entering the crossing (via lowered crossing gates or an actual presence of the train) the Track Clearance Green signal may be terminated by the traffic intersection controller 68. Traffic flow not involving the crossing is permitted to resume without delay once the Track Clearance Green signal is terminated, and traffic flow may be improved considerably.

In a multiple crossing gate embodiment, the signals provided by the video analytic system 70 may include identifying information and the like so that the traffic intersection controller 68 may distinguish an operation of different crossing gates. On this note, the traffic intersection controller 68 can log crossing event activity and crossing gate activation, and even can compare signals associated with different crossing gates and deduce crossing gate malfunctions or other error conditions apart from any corresponding functionality of the video analytic system 70. Likewise, the video analytic system 70 is operable to facilitate detailed logs of crossing events and activity that, among other things, can be used to predictively anticipate crossing activity and develop proactive traffic control algorithms and the like for implementation by the traffic intersection controller 68 based on actual crossing data.

It is also contemplated that crossing gate information can be communicated to still other controllers and devices besides the traffic intersection controller 68 for still other purposes. For instance, the video analytic system 70 can provide signal inputs back to the crossing warning system 52 as confirmation that the crossing gates have actually changed position as well as providing alarm and railroad maintenance information regarding potential gate malfunctions, broken gates, and light outages. This can provide system redundancy for crossing warning systems 52 that already include feedback control systems concerning gate position. Alternatively, the video analytic system 70 can easily and retroactively provide feedback control capabilities to crossing warning systems 52 that do not include feedback controls concerning crossing gate position. That is, an open loop crossing warning system 52 can easily be converted to a closed loop crossing warning system insofar as the crossing gates are concerned when the video analytic system 70 is supplied. This information regarding gate position and proper light operation can then be relayed to a locomotive on approach as part of a health status message when the crossing activation is initiated by a wireless train control system (for example PTC or ITCS).

In still other contemplated embodiments, the video analytic system 70 can facilitate a retrofit adaptation of a railroad crossing to include additional crossing gates 56, crossing signal lights 58, and audio alarms 60 that need not connect to the crossing warning system 52. If additional crossing gates are desired, the controller of the crossing warning system 52 may operate an existing gate in a conventional manner, while the newly added gate simply follows the movement of the existing gate as detected by the video analytic system 70. As such, the newly added gate need not be directly connected to or controlled by the railroad system. In a similar manner, additional or peripheral crossing signal lights 58, and audio alarms 60 may be provided and follow inputs associated with operation of existing gates and hence need not be directly connected to or controlled by the railroad crossing warning system 52 either.

As still another example, crossing gate position information can be communicated by the video analytic system 70 and received by an emergency system that may or may not be part of the traffic control system. As such, a law enforcement vehicle such as a police car, or an emergency response vehicle such as a fire truck or ambulance may be provided with railroad crossing gate position information that accordingly may be considered and utilized to identify traffic disruption associated with railroad crossing and to determine or establish alternative or quicker routes to a response location. Similar information could also be provided to dispatch centers for other drivers such as taxicabs and delivery vehicles so that traffic disruptions may be identified and/or alternate routes may be selected by drivers of such vehicles.

Crossing gate position information by virtue of the video analytic system 70 could even be more generally provided and made available to passenger vehicles and considered for Intelligent Transportation System (ITS) navigation decisions and route selection using global positioning guidance devices and the like to enhance driver convenience. The video analytic system 70 may operate locally at the crossing and signals may be provided, for example, to trigger Infrastructure-to-Vehicle (I2V) messages over Dedicated Short-Range Communication (DSRC) ITS radio within vehicles that are too close to the crossing, and traveling at a speed where it may be likely that the driver does not have full situational awareness of the crossing and the impending arrival of a train.

Crossing gate position information communicated by the video analytic system 70 further allows automated detection and communication of situations wherein, for example, there are local restrictions against trains occupying the crossing for more than a specified period of time. In such a scenario, the video analytic system 70 can track crossing gate down time, infer how long a train is occupying the crossing based on an elapsed down time, and compare train occupancy to applicable limits. If the crossing gate down time exceeds an applicable limit, the video analytic system 70 can send a notification to a responsible party such as the railroad and a municipal officer or authority, as well as create and archive detailed logs of crossing gate down time for use and study by any interested party. Crossing gate down time data can provide valuable information to further improve vehicle traffic flow proximate the crossing by optimizing train speed and length that determine the crossing gate down time and/or to more effectively enforce rules and regulations that have been established by municipalities and authorities at least in part, for traffic control reasons but are otherwise difficult to assess.

Figure 3:
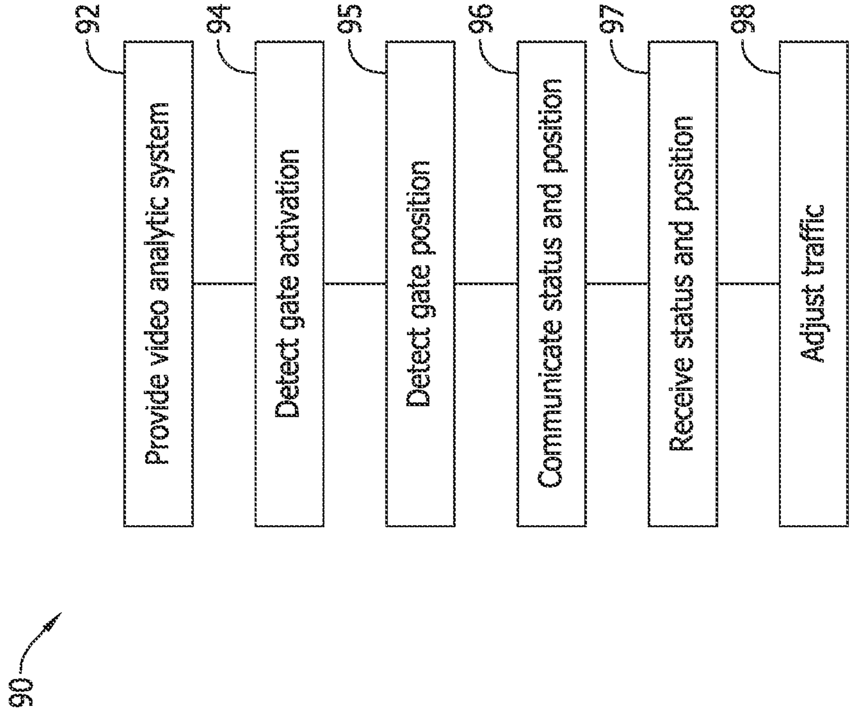
FIG. 3 is an algorithmic flow chart of a method of operating the sensor system shown in FIGS. 1 and 2.

FIG. 3 is an algorithmic flow chart of a method 90 of operating a video analytic system in certain contemplated embodiments.

At step 92, the video analytic system 70 is provided. The video analytic system may be the system 70 described above including the image processing engine 76 configured to utilize any of the techniques described above to sense crossing gate activation, barrier positon and/or train occupancy conditions and to supply signals communicating the sensed conditions. The video analytic system 70 may be provided as a kit for ease of installation, and the step 92 includes supplying the video analytic system 70 with information concerning the parameters of interest such as the crossing gate configuration, the number of warning lights to be monitored, color of the lights, frequency of flashing lights monitored, and expected paths of travel of certain warning lights as the crossing arm barrier is moved between the fully raised and lowered position.

Once installed, the video analytic system is operable to detect an activation of the crossing warning system at step 94 or a change in position of the crossing gate barrier or arm at step 95 using any of the techniques described above. The image processing engine 76 compares actual acquired images to expected images when the crossing gate is activated and operated, and when the expected images are realized a detected condition can be made. Detected events may be communicated at step 96 to another device such as the traffic intersection controller 68 or other systems using appropriate signals and communication techniques. The communication at step 96 may occur more or less simultaneously with the crossing warning system activation and a detected change of position of a crossing gate barrier.

At step 97, the detected events at step 94 and 95 are received by another device, such as the traffic intersection controller 68 or another device described above. Traffic may be adjusted at step 98 by the traffic intersection controller 68 that now knows that the railroad crossing active and that the crossing gates are down to block the crossing. As mentioned above, train occupancy information can also be detected and provided to the traffic intersection controller 68 at step 97 and used for traffic adjustment at step 98.

Alternatively, at step 96 and 97 the crossing state information may be communicated to and received by devices other than a traffic intersection controller 68, and step 98 may accordingly include other adjustments or responses including but not limited to route adjustments for certain vehicles.

Figure 4:
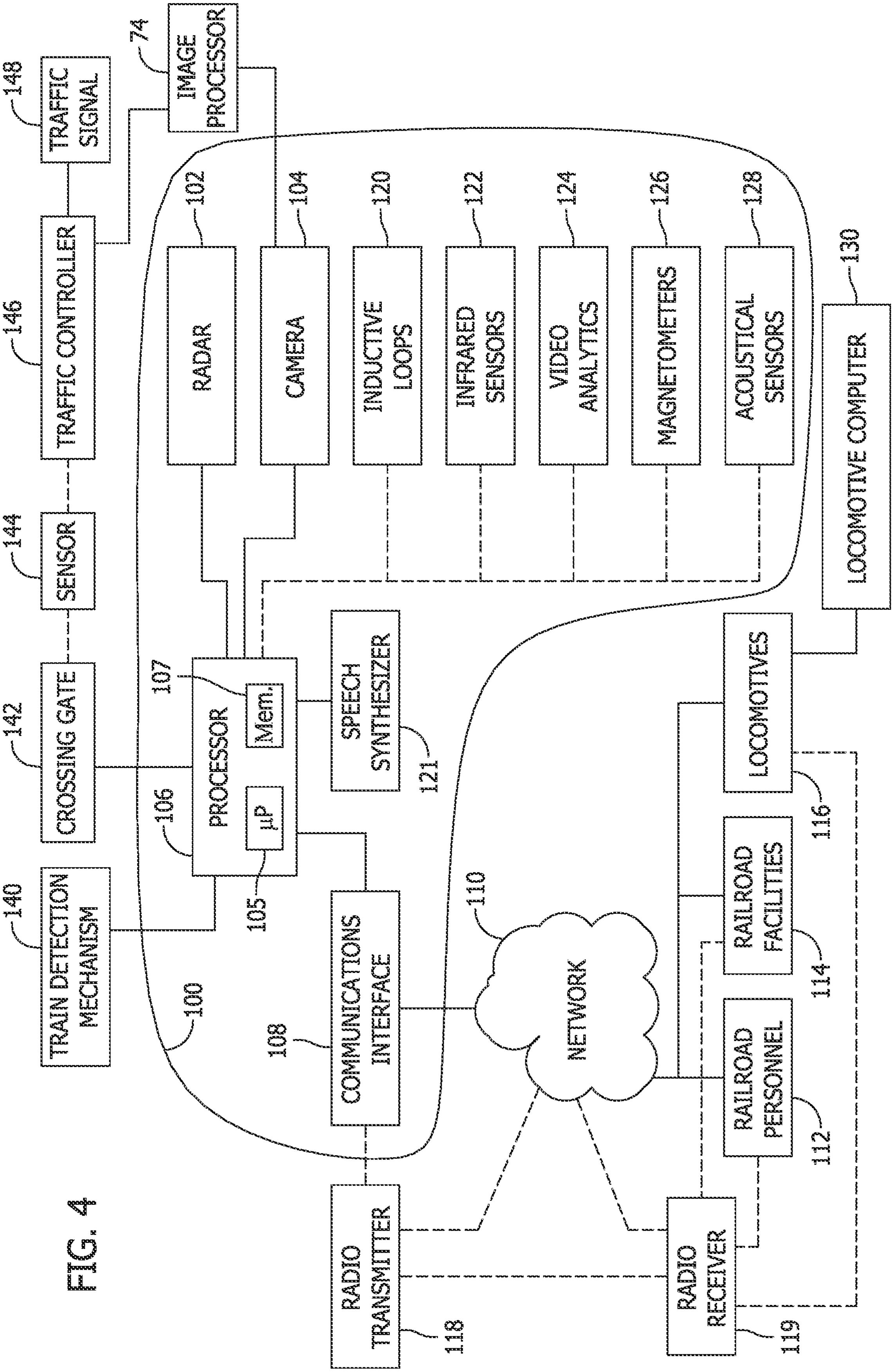
FIG. 4 is an exemplary block diagram of an embodiment of a blocked rail crossing detection and activation system.

FIG. 4 is a block diagram of another exemplary railroad crossing detection and activation system 100. The railroad crossing detection and activation system 100 is operative to prepare a railroad crossing for an approaching locomotive, and also to detect and communicate a blocked crossing to railroad personnel that requires a response. As such the system 100 effectively combines the functionality of a crossing warning system and a potential blocked crossing detection system. That is, the system 100 may both respond to a detected train on approach as well as identify blocked crossing situations that are unrelated to an actual presence of a train in the vicinity, but would present a hazard for a train that can be expected sometime in the future.

As shown in FIG. 4, the exemplary system 100 includes at least one vehicle detection radar 102, at least one video camera 104 to capture images of potential obstruction situations, a local processor 106 programmed to receive data from radar 102 and camera 104 to identify potentially halted vehicles obstructing a railway, and a communications interface 108 operable in relation to one or more networks 110 over which notification messages and images may be sent to remotely located devices associated with, as shown in the example of FIG. 4, railroad personnel 112, railroad facilities 114, and/or en-route locomotives 116. In contemplated exemplary embodiments, the railroad personnel may include personnel in the vicinity of the rail grade crossing or in remote locations, railroad facilities may include a centralized dispatch center, and messages directed to en-route locomotives may be directed to devices onboard the locomotives to advise engineers responsible for locomotive(s) in the vicinity of the blocked crossing.

The term "processor", in relation to the local processor 106, may in various embodiments be, for example, a controller such as a microcomputer, a programmable logic controller, or other processor-based device. Accordingly, it may include a microprocessor 105 and a memory 107 for storing instructions, control algorithms and other information as required for the system 100 to function in the manner described. The memory 107 may be, for example, a random access memory (RAM), or other forms of memory used in conjunction with RAM memory, including but not limited to flash memory (FLASH), programmable read only memory (PROM), and electronically erasable programmable read only memory (EEPROM). Alternatively, non-processor based electronics and circuitry may be provided in the controller with equal effect to serve similar objectives. For example, a supercapacitor may be provided to give the controller time to store procedure sensitive data such as the current state in a software based state machine in the event of power loss.

The network 110 may be any of a variety of known communication networks, including but not limited to long and short range radio communication networks, cellular communication networks, telephone networks, satellite transmission networks, Internet transmission networks, and/or data transmission networks of all kinds. The network 110 may further be, in various exemplary embodiments, a hard wired, point-to-point communication network, a wireless network in which communications are made over air interfaces, or may include combinations of wired and wireless techniques.

For example only, the system 100 shown in FIG. 4 may include a radio transmitter 118 and a radio receiver 119 capable of communicating with one another (using either digital or analog radio techniques) in either a point-to-point or peer-to-peer protocol or in a network of radio transmitters and receivers. In further embodiments, combination transmitter and receiver devices, sometimes referred to as transceivers, may be utilized to establish bidirectional communication between the communications interface 108 located at the site of the railway crossing and remotely located personnel 112, railroad facilities 114, or locomotives 116. It is understood that multiple transmitters 118 and receivers 119 would be used for communication messages and activations from various railway crossing at different geographic locations to personnel 112, facilities 114 and locomotives 116 also at various geographic locations.

The system 100 may also include, as shown in FIG. 4, a speech synthesizer 121 that may be used to automatically generate audio messages and blocked rail notification reports to remote locations via the interface 108 and the network 110. As further explained below, in certain embodiments image data is also transmitted through the network 110 to provide visual inspection of railway obstruction events from remote locations. Audio information, image information, and data information may be communicated through the network 110 using the same or different network paths to provide varying degrees of system redundancy and sophistication.

The vehicle detection radar 102 and the video camera 104 represent different detection technologies for identifying a blocked rail crossing, and the radar 102 and the video camera 104 may be used separately or in combination as desired. That is, in certain embodiments, the system 100 may be provided with one or the other, but not both of the radar 102 and the video camera 104. In other embodiments, the system 102 may include both the radar 102 and the video camera 104 for selective use by the system 100 as desired or as needed according to user preference or suitability for specific locations wherein the system 100 is installed. In still other embodiments, the radar 102 and the video camera 104 may be simultaneously used to provide different indications of a blocked rail crossing with a degree of redundancy. The system 100 is therefore readily adaptable and flexible to produce systems of varying sophistication and complexity.

When the camera 104 is present, it may be utilized as the camera 72 of the video analytic system 70 (FIG. 1) to acquire images and input image data to the image processing device 74 described above to monitor and sense gate activation and operation. It is appreciated, however, that in some installations a separate camera 72 may be desired for use in combination with the image processing device 74 even when the camera 104 is already present.

The blocked rail crossing detection and activation system 100 may likewise incorporate a variety of alternative detection sensors that are communicatively coupled to processor 106 in addition to or in place of vehicle detection radar 102 and/or the video camera 104 as shown in FIG. 4. Such alternative detection sensors may likewise be used to monitor vehicles traveling over the crossing island, either used as stand-alone detection elements or in combination with one another. Such alternative detection sensors may include, for example, buried inductive loops 120, infrared sensors 122, video analytics 124, magnetometers 126, and acoustical sensors 128. The video analytic device 124 in some embodiments may include the image processing engine 76 to provide the functionality explained above concerning crossing state activation and operation sensing, while in other embodiments the image processing engine 76 may be provided in a separate image processing device.

As further explained herein, exemplary embodiments of the system 100 may include at least a microwave radar sensor (radar 102) placed such that it will sense a presence of an obstruction such as a vehicle across the entire crossing island area, or an obstruction such as a vehicle that is located outside the island and MTCD zone but still in the path of an approaching train, with radar 102 mounted out of the roadway, for example, atop an entrance gate barrier associated with the crossing. However, as noted above, contemplated embodiments of the system 100 are not limited to those that incorporate radar 102.

A multiplicity of vehicle detection technologies working collaboratively may be implemented in the system 100 to avoid possible false detection of obstructions and/or human error in responding to blocked crossing events. For example, in a system reliant on human operator(s) to visually determine or confirm blocked rail crossings via images acquired with the video camera 104, an inattentive or poorly trained operator may not promptly take appropriate action to notify others of a blocked crossing. A collaborative use of a multiplicity of vehicle detection technologies, however, may minimize, if not eliminate, any need for image data delivered to a human recipient. For instance, a radar detection system 102 in conjunction with an ending inductive loop-based detection system 120 can provide a sufficiently reliable indication of an obstructing vehicle presence in the crossing so as to automatically generate an alert message to railroad personnel, without any need for confirmation of the obstruction event by a person before the alert message is generated. That is, the collaborative use of vehicle detection technologies can be utilized to automatically detect and confirm blocked crossing events by comparing feedback signals from the various redundant, but different, detection technologies provided. Specifically, if less than all of the various detection technologies provided detects an obstruction, an error condition may be presumed which likely would correspond to a false detection of a railway obstruction. False detection events may accordingly be identified without assistance from human persons, and real time blocked rail crossing information and alerts may be generated much more quickly.

Further, a collaborative implementation of multiple and different vehicle detection technologies may facilitate transmission of reliable blocked crossing alerts across communication mediums either poorly suited for, if not capable of, transporting a visual image from a remote location. Examples of such networks include voice cellular radio, or bandwidth constricted networks.

As also shown in FIG. 4, the local processor 106 is also responsive to a train detection mechanism 140 that notifies the processor 106 of an approaching locomotive 116 advancing toward the crossing. The train detection mechanism is known and not described in further detail herein. In response to a signal from the train detection mechanism 140, the processor 106, among other things activates a crossing gate or gates 142 in a manner further described below that allows automotive vehicles that are in the crossing to exit, and to prevent further automotive vehicles from entering the crossing. Typically the position of the crossing gate arm is derived from limit switches inside the crossing mechanism and motor casing itself These are used to control the range of movement of the gate arm as well as being provided to the local processor 106 that functions as a controller device for the purpose of logging crossing activity, and communicating gate-down position to trains on approach.

When a crossing is located right next to a traffic intersection, crossing activation status as well as gate position are necessary to ensure safe and efficient traffic flow during times when a train is approaching or occupying the crossing island. Accordingly, as shown in FIG. 4, an optional gate positon sensor 144 may be provided on the crossing gate and may communicate with a traffic intersection controller 146 information concerning the position of the crossing gate arm. The traffic intersection controller 146, in turn, may utilize the crossing gate arm position to more effectively manage automotive vehicle flow in the vicinity of the crossing. That is, the traffic intersection controller 146 can operate one or traffic signals 148 in response to the sensed position of the crossing gate. The video analytic system, however, including the image processing engine 76 as previously described, avoids a need for the sensor 144 to be physically integrated with the crossing gate and as such may be preferred in many installations because maintenance does not require coordinated effort by both traffic and railroad personnel.

Figure 5:
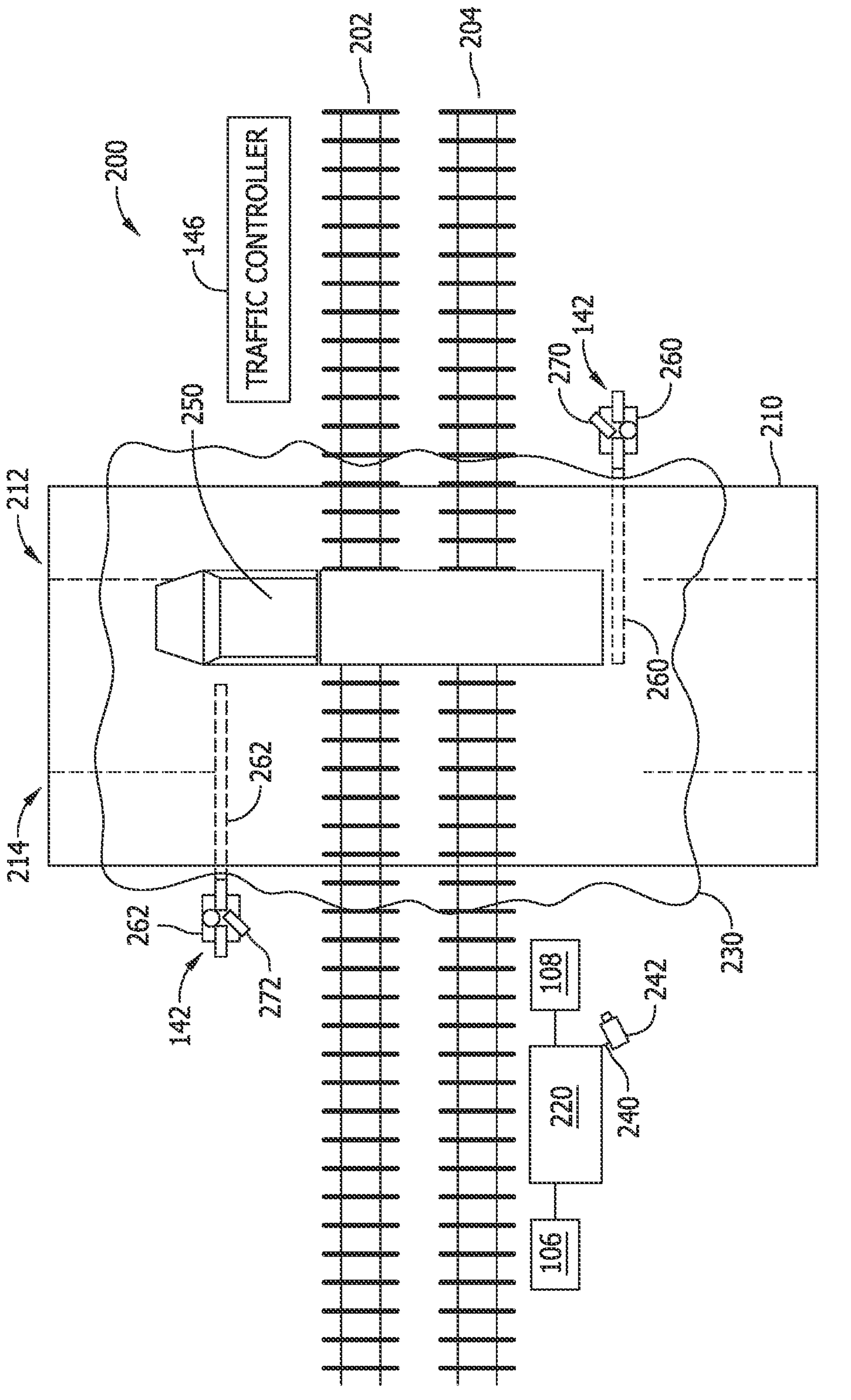
FIG. 5 is an exemplary top view of a grade crossing incorporating the exemplary embodiment of the blocked rail crossing detection and activation system shown in FIG. 4.

FIG. 5 is an exemplary top view of a rail grade crossing 200. As is the case with a typical grade crossing, grade crossing 200 includes at least one set of rail tracks 202, 204, the intersecting roadway 210 including lanes 212 and 214, and a crossing equipment bungalow 220. Tracks 202, 204, roadway 210 and bungalow 220 roughly define the crossing island 230. Certain sensor devices, including but not limited to those mentioned above, are connected to a bungalow mounted electronics assembly 240 that provides crossing occupancy information by lane. In the embodiment of FIG. 5, an outdoor video camera 242 (which may correspond to the camera 104 shown in FIG. 4 or be separately provided) with a view of the entire physical crossing area (island 230) provides image information that is included in notification data sent to railroad personnel 112 (FIG. 4) when a potential obstruction 250 is detected. Thus, railroad personnel 112 may not only be provided notification of an actual (or perhaps even potential) obstruction 250 inside or outside the island and MTCD zone, but may specifically see from the image the actual condition of the island 230 in real time.

In one exemplary embodiment, the camera 242 is equipped with a protective housing and heater where necessary, and is mounted on the equipment bungalow 220. In another embodiment, the camera 242 is mounted on a separate pole, or mounted at any other location from which an adequate view of the crossing area (island 230 and adjacent areas) may be obtained. Crossing gates (represented as element 142 in FIG. 4) including entrance gate barriers 260, 262 (sometimes referred to as crossing gate arms) are associated with the island 230. The crossing gate barriers 260, 262 or arms are movable between generally raised, upright and vertical positions shown in solid lines in FIG. 5, and generally lowered, extending and horizontal positions shown in FIG. 5 in phantom lines. In the raised position, the crossing gate barriers 260, 262 or arms are stored alongside the automotive traffic lanes 212, 214 of the roadway 210 allowing automotive vehicles to freely pass, while in the lower position the crossing gate barriers 260, 262 or arms extend across the automotive traffic lanes 212, 214 and block automotive vehicles from entering the island 230 via the respective lanes 212, 214 of the roadway 210.

In the embodiment illustrated in FIG. 5, microwave radar sensors 270, 272 are placed such that in combination, they will sense across the entire area of the crossing island 230 (as well as the immediately adjacent area outside the boundary of the crossing island and the MTCD zone 230 within range of the radar sensors), with the radar sensors 270, 272 mounted out of the roadway 210. In certain embodiments, and in the embodiment of FIG. 5, a radar sensor 270, 272 is associated with each of the respective entrance gate barriers 260, 262. Sensors 270, 272 may be mounted in other locations associated with a grade crossing, however. In an alternative embodiment, each radar sensor 270, 272 is configured for sensing the entirety of the crossing island 230, which may provide redundancy in the case of a radar failure.

The grade crossing 200 is further equipped to provide status and control signals available from a railroad crossing controller, which may be the local processor 106 shown in FIG. 4, to alert operators of road vehicles of an approaching locomotive. Island Relay and Crossing Relay signals, familiar to those in the art, may be supplied for such purposes. The system 100, and in particular the local processor 106, may further interface with these status and control signals for further detection reliability. For example, known Island Relay circuits will indicate when a train is occupying the crossing. During these periods when a train is present at the crossing, virtually all of the vehicle detection system technologies provided in the system 100 will also register a "detection" state and indicate a blocked crossing. An Island Relay signal, or other status and control signal provided for detection of the train can be coordinated and compared with the signals from the vehicle detection sensors provided to prevents a false, blocked crossing detection and related alerts when the blocked crossing detection is, in fact, attributable to the presence of a train, rather than some other obstruction (e.g., a vehicle), in the crossing island.

Components of the system 100 (FIG. 4) such as the processor 106 and communication interface 108 of the system 100, when deployed as shown in FIG. 5, may be deployed within bungalow 220. Specifically, electronics in the equipment bungalow may support the vehicle detection subsystem made up of radars 270, 272, and camera 242 (which may provide image data to implement the video analytic system described above), provides power to all such components, and operates a processor, such as processor 106, to detect potential obstruction situations within the crossing island and communicate such detections to, for example, a railroad dispatch center 114 (FIG. 4), railroad personnel 112 (FIG. 4), or locomotives 116 (FIG. 4) for the benefit of locomotive engineers.

When the system 100 is implemented in the crossing 200, an obstructing vehicle presence within each lane 212, 214 of roadway 210 is sensed and/or tracked. It is contemplated that roadways wider and narrower than the two lane embodiment of FIG. 5 may be included in any particular crossing. Additions of radar sensors or reconfiguration of radar sensors may ensure that all lanes of a roadway are accounted for. In one operative embodiment, any vehicle 250 that moves into the crossing island 230 and stops for a predefined, programmable period (e.g. 90 seconds or longer) is presumed to be disabled or permanently stranded in the crossing island 230. When such a vehicle 250 is detected by the sensors provided, the system 100 outputs data to the network 110 (FIG. 4). The output data may include, for example, pictures taken by the camera and/or displays generated from radar data (as well as data relating to any of the alternative sensors described above) for review by personnel associated with the railroad.

As those skilled in the art will readily understand, certain embodiments of the system 100 as contemplated utilize existing sensor technologies to identify that a vehicle is within a crossing island. One such technology incorporates video image capture and sophisticated classification analytics for the purposes of vehicle detection inside the crossing island. However, environmental conditions and lighting situations degrade reliability and create finite uncertainty for a vehicle detection system based solely on video imaging as video image based solutions are somewhat subject to lighting and weather conditions. An additional sensor technology by which vehicles may be detected incorporates buried inductive loops. However, this detection solution has a shorter life and higher maintenance costs due to the embedding of the inductive loops within the ground. Specifically, inductive loops buried in the ground are subject to the wear and tear of the underground environment as well as the wear and tear incurred as highway and rail traffic pass over the loops. While very costly video/analytics and combinations of sensor technologies can achieve increasing levels of reliability to detect vehicles in the crossing island, a level of uncertainty will always exist.

The embodiments described herein that utilize radar based detection provide a longer life and lower maintenance consequence solution as compared to embedded detection technology and do not require installation in the roadway itself. Further, non-embedded radar detection techniques are not weather and lighting dependent as are video image based solutions. In addition, the radar sensor based embodiments can be easily combined with the existing technologies described herein. Incorporation of the communications modalities described herein, both with and without radar based sensors, provide a more reliable mechanism for detecting candidate blocked crossing situations and forwarding such notifications to a person with far greater processing resources and situational awareness. With more reliable data, that person can make better decisions regarding whether and what kind of response should be taken, such as alerting locomotives approaching the crossing of the obstruction in order to lessen the chance of a collision. Combining the radar sensor and communications capabilities with existing technologies provides an increasingly reliable blocked rail crossing detection and activation system.

Figure 6:
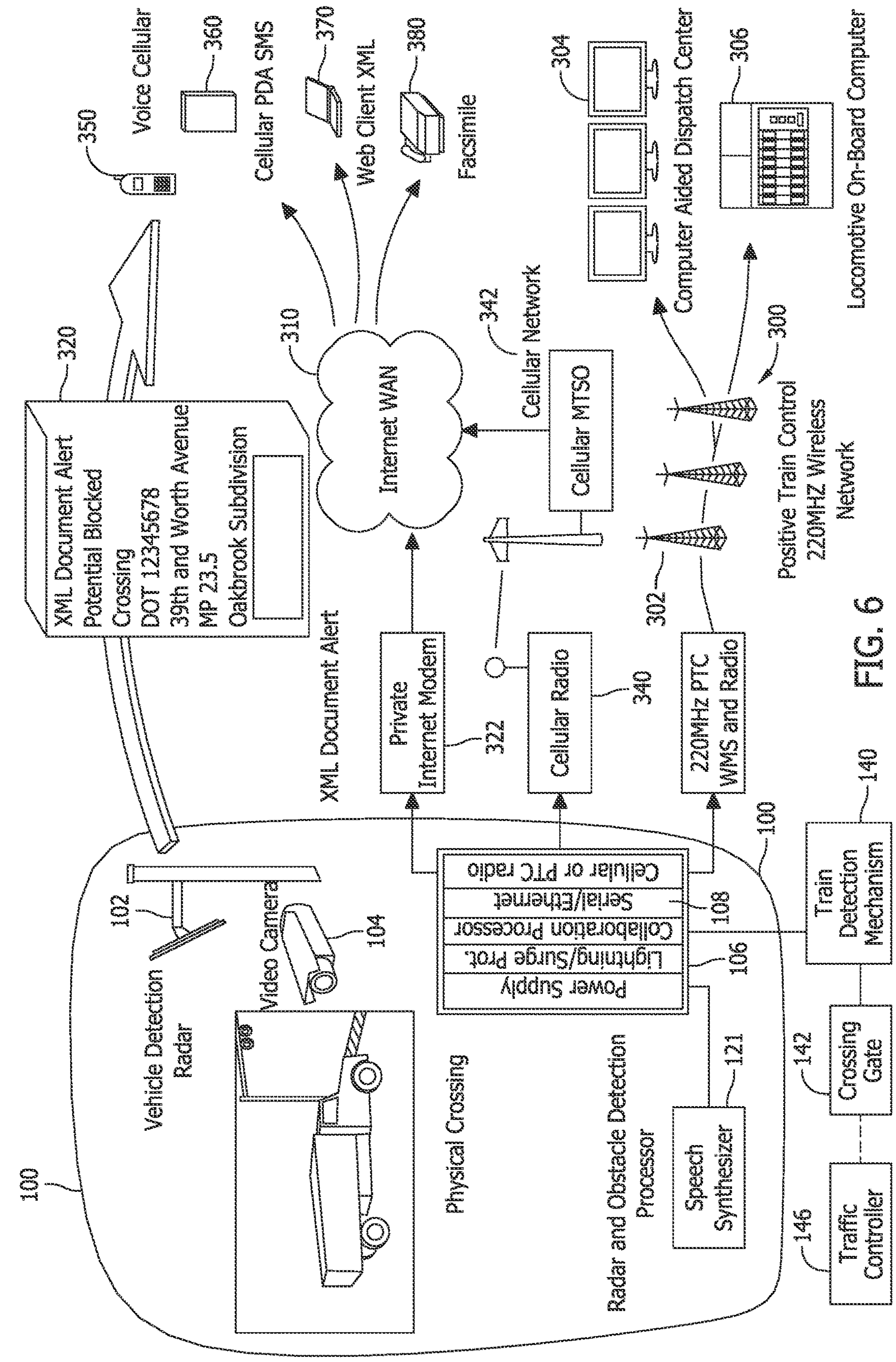
FIG. 6 is a schematic diagram illustrating exemplary communication modalities that may be interfaced with the blocked rail crossing detection and activation system shown in FIG. 4.

FIG. 6 is a schematic diagram of the system 100 communicatively coupled to numerous wired and wireless communication network options, illustrating it is now possible to more efficiently detect a possible obstruction, or candidate, and send a notification to the network, along with an image of the crossing island and/or radar image data, to a human who can interpret the situation. FIG. 6 illustrates that the "network" includes one or multiple modalities for transfer of the information from system 100 to a human consumer of such information. Such human interpretation provides reliability as other dynamic and situational data can be taken into account.

One communications modality contemplated is the railroad industry's Positive Train Control (PTC) private wireless infrastructure 300. In the PTC infrastructure 300, the communications interface 108 associated with processor 106 is to a 220 MHz wireless network 302 (or other PTC communication modalities as may become available) that provides the crossing island sensor detection information, as described above, to one or both of a computer aided railroad dispatch center 304 or an onboard computer 306 associated with a particular locomotive. Of course, such information may be distributed to multiple locomotives, as determined by the particular crossing island situation and the current location of those locomotives relative to the crossing.

In addition to or separate from the PTC infrastructure 300, wired and wireless Internet 310 may be utilized for delivering notification data relating to a vehicle detection within the crossing island, for instance in the form of an XML document 320, to railroad resources using the public or private Internet. Wired Internet may be accomplished using nearby public network resources such as cable or DSL routed to the crossing bungalows 200 (FIG. 5) where a modem 322 is communicatively coupled to the communications interface 108 of processor 106. Wireless Internet may be utilized using available wireless channels such as a community Wi-Fi system.

Cellular radio 340 is yet another communications modality that can be communicatively coupled to the communications interface 108 of processor 106 and eventually routed to the Internet 310 for communications of data relating to vehicle detection within the crossing island. Examples include a digital cellular radio 340 over the public cellular network 342. Voice or text message notifications may accordingly be utilized over cellular devices.

The PTC infrastructure 300, wired and wireless Internet 310, and digital cellular radio 340 via the Internet 310, allow notification data to be formed and delivered in a variety of forms. One delivery form includes synthesized voice message alerts, generated by the speech synthesizer 121 (FIG. 4) to specific telephones or cellular phones 350. As one example, recipients of a voice message may access an Internet channel and navigate to a location where an image may be seen, permitting full analysis of the potential obstructed crossing situation and execution of a commensurate response.

Another delivery form includes text or SMS message delivery to mobile devices such as handheld personal digital assistant (PDA) devices 360 or cellular telephones 350, either providing an embedded picture or an Internet hyperlink where an image may be found, permitting full analysis of the potential obstructed crossing situation and execution of a commensurate response.

Another delivery form is through a web services session where alert and image data are communicated to a client via a computer 370 that is located at a railroad organization, a local public safety organization, or a proximate maintenance location. Yet another delivery form is to a facsimile machine 380 along with embedded image information.

As previously mentioned, another delivery form is through a voice radio circuit where alert information is communicated to a client via speech synthesizer 121 (FIG. 4) and a UHF or VHF radio transmitter 118 (FIG. 4). Alert information regarding a potentially blocked or obstructed railroad crossing may be thus communicated to railroad personnel over the railroad organization's handheld or vehicle borne mobile radio system that may include the receiver 119 (FIG. 4).

With regard to the PTC infrastructure 300, the North American railroad industry has a private wireless networking infrastructure used for managing train traffic, under the Positive Train Control (PTC) legislation established in 2008. While the primary purpose of the PTC infrastructure is to control the speed and location of train traffic and to monitor the position of turnout switches, the PTC infrastructure is expected to be available for other railroad information management purposes. Primarily operating on (but not limited to) a ubiquitous 220 MHz wireless network as shown in FIG. 6, information from crossings and other wayside equipment may be made accessible over these private networks. With intrinsic connectivity to centralized Computer Aided Dispatch centers (CAD) and to on board locomotive computers, the PTC wireless infrastructure 300 is an ideal path across which potential crossing obstacle alerts may be delivered for review and possible action.

Future uses of the PTC network and the communication path between the locomotive and approaching crossings anticipate the on-board locomotive system communicating crossing warning system activation instructions in lieu of crossing-based track circuits currently used to detect approaching locomotives. Within the currently anticipated communications protocol between the crossing equipment and the onboard system are messages associated with the health and operational status of the crossing warning system, as well as verification of crossing warning system activation. It is anticipated that the verification of a clear and unobstructed crossing island will also be a valuable status message as the approaching locomotive onboard computer system activates the crossing and receives verification and acknowledgement of crossing warning system performance. Any failure of crossing warning system activation or a blocked crossing condition would cause the locomotive to reduce speed as necessary to prevent possible collisions, whether due to an inoperable gate system or an obstructed crossing island.

An onboard locomotive cab computer 130 can poll the system 100 at each crossing 200 utilizing the wireless PTC communication infrastructure. In this manner, a locomotive on approach to any given crossing may be appraised of crossing warning system status including whether or not the crossing island is clear of obstacles.

Numerous standardized document protocols exist for conveying an alert accompanied by an image to any of the aforementioned recipient devices or utilizing any of the aforementioned wide area networks. As mentioned herein, the most common is an XML document, a self-describing information wrapper that is typically used for IP networks and inter-process communication. XML documents are readily utilized, or consumed, by recipient devices for presentation, without requiring the sender application to have a prior awareness of the capabilities of the possible recipient, consumer devices. Other alert formats include publish/subscribe and other proprietary UDP protocols. As mentioned in the foregoing, communication over the PTC network utilizes messages and protocols established by and standardized upon the entire railroad industry to assure interoperability across all railroad operators and territories.

As mentioned previously, the local processor 106 is also responsive to a signal input from a train detection mechanism 140 and can communicate information regarding the same using the modalities and media described above. The local processor 106 operates the crossing gates 124 (FIG. 5), and specifically the crossing gate barriers or arms 260, 262 in response to the train detection signal. In turn, the video analytic system and the image processing engine described above may detect operation of the crossing gates and generate signals known to those in the art as preemption signals to the traffic intersection controller 146, sometimes referred to a traffic intersection controller, to permit traffic flow to be sequenced by the traffic intersection controller 146 so that automotive vehicles that need to clear out of the crossing island 230 are given a green light via a traffic signal 148 (FIG. 4), and so that automotive vehicles that could enter the crossing island 230 and become trapped or 'queued-up' on the crossing island 230 are given a red light via a traffic signal 148 and thus warned not to enter the crossing island 230.

Preemption signals may be provided to the processor 146 by the train detection mechanism 140 and more specially via relays or similar switches that open a DC circuit to communicate the upcoming arrival of a train to the traffic intersection controller 146. There are generally two types of preemption signals that may be provided, namely, Simultaneous Preemption and Advanced Preemption.

Simultaneous Preemption is signaled to a traffic intersection controller 146 using the same circuit that the railroad equipment detecting a train (i.e., the train detection mechanism 140) uses to activate the crossing warning system (called a Crossing Relay or XR). With Simultaneous Preemption, clearing vehicles from the crossing and halting those that could enter must be accomplished very quickly because the gate descent for the crossing gate barriers or arms 260, 262 is also triggered by that XR signal.

Advance Preemption is a signal that informs the adjacent traffic intersection controller 140 ahead of the crossing warning system activation so that more time is allotted for vehicles to clear the crossing island 230 before the crossing gate barriers or arms 260, 262 start to descend.

Preemption signals are clearly necessary to assure vehicles have the opportunity to evacuate the crossing island 230 prior to the arrival of a train. In many cases, traffic in other directions through the traffic intersection is also halted until the train has cleared and the crossing warning system is deactivated.

Limiting situations where all intersection traffic is stopped, waiting for an intersection signal state to time-out, wastes energy and also minimizes the chance that impatient drivers would elect to proceed in defiance of traffic signal instructions. That is, the longer that traffic is stopped, the greater the chance that impatient drivers may ignore traffic signals and/or drive around the crossing gate barriers or arms 260, 262 and enter the crossing island 230.

Crossing gate position may be used in some cases in order to inform the traffic intersection controller 146 that the part of the roadway that extends over the crossing island 230 is now sealed off. This permits the traffic intersection controller 146 to prioritize and resume flow for vehicles that are not going to travel in or out of the crossing island 230. A signal used by the railroads to indicate when a train is actually on and passing through the crossing island, called the Island Relay (IR), may also be used for this purpose by the traffic intersection controller 146. In order to do so, however, some modification of the detection and activation system 100 is required to establish point-to-point hard-wired connections in a conventional manner to interface sensor conventional components and conventional controls. Railroad organizations, however, are understandably reluctant to do so.

With regard to interfacing the crossing detection and activation system generally, railroads are as a practical matter exposed to substantial liabilities to high visibility consequences of train-auto collisions. The railroads' financial status frequently invites legal action against the railroad even in accident cases without clear merit regarding railroad culpability. Often, when there is an accident, the railroad does not escape without a settlement or penalty, often regardless of the true underlying causal factors.

Consequently, railroads are hesitant to provide a variety of signals to traffic intersection controllers, such as the controller 146, to facilitate and optimize traffic flow. In doing so, railroads undesirably become increasingly responsible for the overall coordinated operation of both the railroad crossing warning system and the adjacent traffic intersection controller 146.

Providing a Simultaneous or Advance Preemption signal as described above helps to clear the crossing island of vehicles but permits the railroad and the traffic system controllers operate with a high level of autonomy. But as additional signals such as train occupancy or gate position are supplied to adjacent traffic intersection controllers 146, railroads are negatively impacted in a number of ways. For example, uncertain liability risks if the combined systems do not work as expected—even if damaged due to other non-railroad causes. Liability exposure if other, non-railroad parts of the system do not function as intended is a practical concern of the railroad. Increased cost associated with installing and maintaining gate position sensor circuits connected to adjacent traffic intersection controllers are undesirable. Increased cost associated with installing and maintaining Island Relay circuit outputs to adjacent traffic intersection controllers is also undesirable to the railroad. The railroads also face increased costs to add components and sensors to the railroad gate mechanism to serve as an interface for the traffic intersection controller 146. Hard wired connections to additional components means more exposure to railroad equipment transient, surge, and malicious damage due to increased exposed wiring brought out from the railroad equipment house or bungalow 220.

Still further, because a conventional gate position sensor typically would have to connect to and through railroad circuitry in the system 100, any conventional crossing gate sensor system that is procured, housed, and part of the crossing warning system requires that the railroad install and maintain the system. This includes maintaining the interface between the railroad and the traffic system, replacement of batteries, testing requirements, and periodic inspection of wiring depending on what system is used to detect and communicate those states.

The video analytic sensor systems and methods to monitor railroad crossing gate activation and gate position as described herein advantageously overcomes these and other difficulties in the art. The video analytic systems and associated methods of communicating crossing starts and gate up/down position to adjacent traffic intersection systems needing preemption initialization to clear potential vehicle queues on crossing islands may be installed and realized at relatively low cost without impacting the railroad and without altering the crossing detection and activation system 100.

The unique aspects of the video analytic system 70 as described include at least the following. The video analytic system 70 need not be owned or procured by the railroad. The video analytic system 70 does not need to connect to any railroad circuitry or system. The railroad does not need to maintain the video analytic system 70.

Communication between the crossing and the traffic system controller 146 may be accomplished utilizing low power wireless communications or mesh networking, eliminating the need for the traffic system and the railroad equipment to be connected with outside wiring. Delivery of performance metrics (e.g. number of gate movements) to detect any performance degradation or missed gate position detection is facilitated. Broken and malfunctioning gate situations may be sensed and detected that may otherwise be difficult to sense or detected in an automated manner. Information may be communicated to various non-railroad organizations and more generally to the public regarding railroad crossing activity that may permit dispatch centers and vehicle drives to more effectively avoid traffic disruptions associated with railroad crossings.

Having now described the controllers and functionality of the sensor system, as well as the systems contemplated for use in combination with the sensor system, it is believed that programming of otherwise configuring the controllers described to effect the purposes and benefits is disclosed is within the purview of those in the art without further explanation.

The benefits and advantages of the inventive concepts disclosed are now believed to be evident in view of the exemplary embodiments disclosed.

An embodiment of a sensor system has been disclosed for a railroad crossing including at least one warning light activated by a crossing warning system that receives a signal input from a train detection mechanism. The sensor system includes: at least one camera in a line of sight with the at least one warning light; and at least one image processing device in communication with the at least one camera. The at least one image processing device is configured to: determine, based on images received from the at least one camera, an activation of the crossing warning system via predictable operation of the at least one warning light by the crossing warning system; and communicate the activation of the crossing warning system to a vehicular traffic control device.

Optionally, the at least one warning light may include multiple warning lights at different locations in the crossing, and the at least one image processing device may be configured to determine an activation of the crossing warning system based on an operation of the multiple warning lights by the crossing warning system. The multiple warning lights may include at least one static light and at least one dynamic light. The at least one image processing device may be configured to recognize a frequency of the at least one dynamic light.

As further options, the at least one warning light may be provided on at least one crossing gate located in the crossing, and the at least one image processing device may be configured to sense an illumination of the at least one warning light by the crossing warning system. The at least one crossing gate may include a movable barrier positionable between a raised position providing free passage to automotive traffic flow across the island and a lowered position obstructing automotive traffic flow across the island, the at least one warning light mounted on the movable barrier, and the at least one image processing device configured to detect a position of the at least one warning light when the movable barrier is in at least one of the raised position and the lowered position. The at least one crossing gate may include a plurality of spaced apart warning lights on the movable barrier, the plurality of warning lights respectively traversing an arcuate path when the movable barrier is moved between the raised position and the lowered position, and the at least one image processing device configured to detect movement of the plurality of warning lights along each respective arcuate path as the movable barrier is raised or lowered. The at least one image processing device may also be configured to detect a change in position of the at least one warning light, with the at least one image processing device being configured to determine a raised or lowered position of the movable barrier based on the change in position of the at least one warning light. The at least one warning light may include a plurality of warning lights provided on the movable barrier, and the at least one image processing device may be configured to detect a change in position of the plurality of warning lights, the at least one image processing device configured to determine a raised or lowered position of the movable barrier based on the change in position of the plurality of warning lights. The at least one crossing gate may include a plurality of spaced apart warning lights on the movable barrier, and at least one the plurality of warning lights may be a flashing light. The at least one image processing device may be configured to detect a flashing pattern of the at least one flashing light.

The at least one camera may be in a line of sight with at least two warning lights located on respectively different sides of the crossing, and the at least one image processing device may be configured to detect a presence of a train at the railroad crossing using the at least two warning lights.

The at least one image processing device may also configured to, based on detected operation of the at least one warning light, determine at least one of a warning light failure, a broken crossing gate, or a malfunctioning crossing gate.

Optionally, the vehicular traffic control device is a traffic intersection controller or an automotive navigation decision and route selection device. The sensor system may trigger an Infrastructure-to-Vehicle message over a Dedicated Short-Range Communication radio within a vehicle. The vehicular traffic control device may also be associated with an emergency vehicle. The vehicular traffic control device may also be a dispatch device for a delivery vehicle.

The at least one camera may be a video camera equipped with a video analytics engine.

An embodiment of a railroad crossing gate detection system for at least one crossing gate at a railroad crossing has also been disclosed. The crossing gate includes a plurality of warning lights and a movable barrier to permit or obstruct vehicle access through the railroad crossing, at least some of the plurality of warning lights are mounted to the movable barrier. The railroad crossing gate detection system includes: at least one video camera located at a predetermined distance from the at least one crossing gate and in a line of sight with the plurality of warning lights; and at least one image processing device in communication with the at least one video camera. The at least one image processing device is configured to: determine an operation of the movable barrier of the at least one crossing gate by detecting an operation the at plurality of warning lights; and communicate the state of the railroad crossing detection and activation system to a vehicular traffic control device.

Optionally, the plurality of warning lights may include at least one static light and at least one flashing light, the at least one image processing device configured to compare real time images of the plurality of warning lights to predetermined images of the plurality of warning lights to detect a position of the movable barrier. The at least one image processing device may be configured to detect one of a relative position of the plurality of warning lights with respect to one another and a flashing pattern of at least some of the plurality of warning lights to detect a change in position of the movable barrier. The at least one video camera may be in a line of sight with the at least two warning lights located on respectively different sides of the crossing, and the at least one image processing device may be configured to detect a presence of a train at the railroad crossing using the at least two warning lights. The vehicular traffic control device may be one of a traffic intersection controller, an automotive navigation decision and route selection device, a device associated with an emergency vehicle, or a dispatch device for a delivery vehicle. The at least one image processing device may be configured to, based on detected operation of at least some of the plurality of warning lights, determine at least one of a warning light failure, a broken crossing gate, or a malfunctioning crossing gate.

An embodiment of a railroad crossing gate detection system for at least one crossing gate operated by a crossing warning system has also been disclosed. The at least one crossing gate includes a stationary support and a movable barrier each provided with plurality of warning lights. The movable barrier is positionable relative to the stationary support between first and second positions relative to a railroad crossing to permit or obstruct vehicle access through the railroad crossing. The detection system includes: at least one video camera at a predetermined distance from and in a line of sight with the plurality of warning lights on the stationary support and the movable barrier; and at least one image processing device in communication with the at least one video camera. The at least one image processing device is configured to: determine an activation of the crossing warning system based on a detected change in position of the movable barrier via a detected operation of the plurality of warning lights on the stationary mast and the movable barrier by the crossing warning system; and communicate the state of the railroad crossing detection and activation system to a vehicular traffic control device; wherein the vehicular traffic control device is one of a traffic intersection controller, an automotive navigation decision and route selection device, a device associated with an emergency vehicle, or a dispatch device for a delivery vehicle.

Optionally, the at least one image processing device further is configured to, based on detected operation of at least some of the plurality of warning lights, determine at least one of a warning light failure, a broken crossing gate, or a malfunctioning crossing gate. The at least one video camera may be in a line of sight with at least two warning lights located on respectively different sides of the crossing, and the at least one image processing device may be configured to detect a presence of a train at the railroad crossing using the at least two warning lights. The at least one imaging processing device may be configured to detect at least one of an illumination of a warning light, a frequency of a flashing warning light, or a movement of a warning light along an expected path.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A warning light sensor system for a railroad crossing including at least one warning light activated by a crossing warning system that receives a signal input from a train detection mechanism corresponding to a train approaching the railroad crossing, the warning light sensor system comprising:

at least one processor-based device configured to:

determine, solely with respect to an automated processing of received images of the at least one warning light, a presence or absence of a simultaneous combination of predictable attributes of the at least one warning light when actually activated by the crossing warning system due to the received signal input from the train detection mechanism; and automatically communicate, based on the determined presence or absence of the simultaneous combination of predictable attributes of the at least one warning light, a crossing warning system operating status to an external device prior to the train arriving at the railroad crossing;

wherein the simultaneous combination of predictable attributes of the at least one warning light is selected from the group of a warning light illumination intensity, a warning light illumination color, a warning light flashing frequency, a warning light position, a movement of the warning light along a predicated path of travel, and a flashing pattern.

2. The warning light sensor system of claim 1, wherein the at least one warning light includes multiple warning lights at different locations in the railroad crossing, and wherein the at least one processor-based device is further configured to:

determine, solely with respect to an automated processing of images including the multiple warning lights, a presence or absence of the simultaneous combination of predictable attributes for each respective one of the multiple warning lights; and determine, based on a collective presence or absence of the simultaneous combination of predictable attributes for each respective one of the multiple warning lights, whether the crossing warning system is operating properly.

3. The warning light sensor system of claim 2, wherein the multiple warning lights includes a combination of at least one static light and at least one dynamic light.

4. The warning light sensor system of claim 3, wherein the at least one processor-based device is configured to recognize a specified flashing frequency of the at least one dynamic light.

5. The warning light sensor system of claim 1, wherein the at least one warning light is provided on at least one crossing gate located in the railroad crossing, and wherein the at least one processor-based device is configured to determine a presence or absence of illumination of the at least one warning light on the at least one crossing gate when activated by the crossing warning system.

6. The warning light sensor system of claim 5, wherein the railroad crossing includes a crossing island, wherein the at least one crossing gate includes a movable barrier positionable between a raised position providing free passage to automotive traffic flow across the crossing island and a lowered position obstructing automotive traffic flow across the crossing island, the at least one warning light mounted on the movable barrier, and the at least one processor-based device configured to detect a presence or absence of a predictable position of the at least one warning light when the movable barrier is in the raised position or in the lowered position.

7. The warning light sensor system of claim 6, wherein the at least one crossing gate includes a plurality of spaced apart warning lights on the movable barrier, the plurality of spaced apart warning lights respectively traversing an expected path when the movable barrier is moved between the raised position and the lowered position, and the at least one processor-based device configured to detect a presence or absence of a predictable simultaneous movement of the plurality of spaced apart warning lights along each respective expected path as the movable barrier is raised or lowered.

8. The warning light sensor system of claim 6, wherein the at least one processor-based device is configured to determine a raised or lowered position of the movable barrier based on a detected change in position of the at least one warning light.

9. The warning light sensor system of claim 8, wherein the at least one warning light comprises a plurality of warning lights provided on the movable barrier, the at least one processor-based device configured to detect a simultaneous change in position of a combination of the plurality of warning lights, the at least one processor-based device configured to determine a raised or lowered position of the movable barrier based on the detected simultaneous change in position of the combination of the plurality of warning lights.

10. The warning light sensor system of claim 6, wherein the at least one crossing gate includes a plurality of spaced apart warning lights on the movable barrier, and wherein at least one of the plurality of spaced apart warning lights is a flashing light.

11. The warning light sensor system of claim 10, wherein the at least one processor-based device is configured to detect a flashing pattern of the at least one flashing light.

12. The warning light sensor system of claim 1, wherein the crossing warning system includes a first warning light and a second warning light located on respectively different sides of the railroad crossing, and wherein the at least one processor-based device is configured to detect a presence of a train at the railroad crossing using the determined presence of the first warning light and the determined absence of the second warning light in the received images.

13. The warning light sensor system of claim 1, wherein the at least one processor-based device is further configured to:

based on the determined presence or absence of the simultaneous combination of predictable attributes in the received images, identify a warning light failure, a broken crossing gate, or a malfunctioning crossing gate; and communicate alarm information concerning the identified warning light failure, broken crossing gate, or malfunctioning crossing gate.

14. The warning light sensor system of claim 13, wherein the communicated alarm information is received by a locomotive on approach to the railroad crossing.

15. The warning light sensor system of claim 13, wherein the communicated alarm information is received by a vehicular traffic control device.

16. The warning light sensor system of claim 15, wherein the vehicular traffic control device is a traffic intersection controller for at least one signalized roadway intersection located away from the railroad crossing.

17. The warning light sensor system of claim 15, wherein the vehicular traffic control device is an automotive navigation decision and route selection device.

18. The warning light sensor system of claim 17, wherein the communicated alarm information is transmitted in an Infrastructure-to-Vehicle message.

19. The warning light sensor system of claim 15, wherein the vehicular traffic control device is associated with an emergency vehicle.

20. The warning light sensor system of claim 15, wherein the vehicular traffic control device is a dispatch device for a delivery vehicle.

21. The warning light sensor system of claim 13, wherein the communicated alarm information is transmitted wirelessly.

22. The warning light sensor system of claim 1, wherein the at least one processor-based device is configured to, in view of a determined presence of the simultaneous combination of predictable attributes in the received images automatically communicate a preemption signal to a traffic intersection controller.

* * * * *